DEFLECTION CIRCUIT FOR REGULATING THE HIGH VOLTAGE LOAD

Filed Oct. 16, 1968 7 Sheets-Sheet 1

INVENTOR.
JAN J. RIETVELD,
ANTHONIE J. MOGGRÉ
BY
Frank R. Jufari
AGENT

INVENTOR.
JAN J. RIETVELD,
ANTHONIE J. MOGGRÉ
BY
Frank R. Trifari
AGENT

INVENTOR.
JAN J. RIETVELD
ANTHONIE J. MOGGRÉ
BY
AGENT

INVENTOR.
JAN J. RIETVELD
BY ANTHONIE J. MOGGRE

AGENT

INVENTOR.
JAN J. RIETVELD,
ANTHONIE J. MOGGRÉ
BY
Frank R. Trifari
AGENT

March 10, 1970 J. J. RIETVELD ET AL 3,500,116

DEFLECTION CIRCUIT FOR REGULATING THE HIGH VOLTAGE LOAD

Filed Oct. 16, 1968 7 Sheets-Sheet 6

INVENTOR.
JAN J. RIETVELD,
ANTHONIE J. MOGGRE
BY

AGENT

INVENTOR.
JAN J.RIETVELD ,
ANTHONIE J.MOGGRÉ
BY
[signature]
AGENT

United States Patent Office 3,500,116
Patented Mar. 10, 1970

3,500,116

DEFLECTION CIRCUIT FOR REGULATING THE HIGH VOLTAGE LOAD

Jan Joost Rietveld and Anthonie Jannis Moggre, Emmasingel, Eindhoven, Netherlands, assignors, by mesne assignments, to U.S. Philips Corporation, New York, N.Y., a corporation of Delaware Filed Oct. 16, 1968, Ser. No. 768,013
Claims priority, application Netherlands, Oct. 31, 1967, 6714750
Int. Cl. H01j *29/70*
U.S. Cl. 315—22 11 Claims

ABSTRACT OF THE DISCLOSURE

A television horizontal deflection system including means for regulating the high voltage generated during the fly-back period. The deflection system is preferably tuned to the fifth harmonic and the leakage inductance and capacitance are arranged so that the frequency ratio $\delta/\alpha$ lies between the limits of $$.95\sqrt{\frac{\gamma^2}{\alpha^2}+\frac{\gamma}{\alpha}+1} \text{ and } 2\sqrt{\frac{\gamma^2}{\alpha^2}+\frac{\gamma}{\alpha}+1}$$

Figure 1:
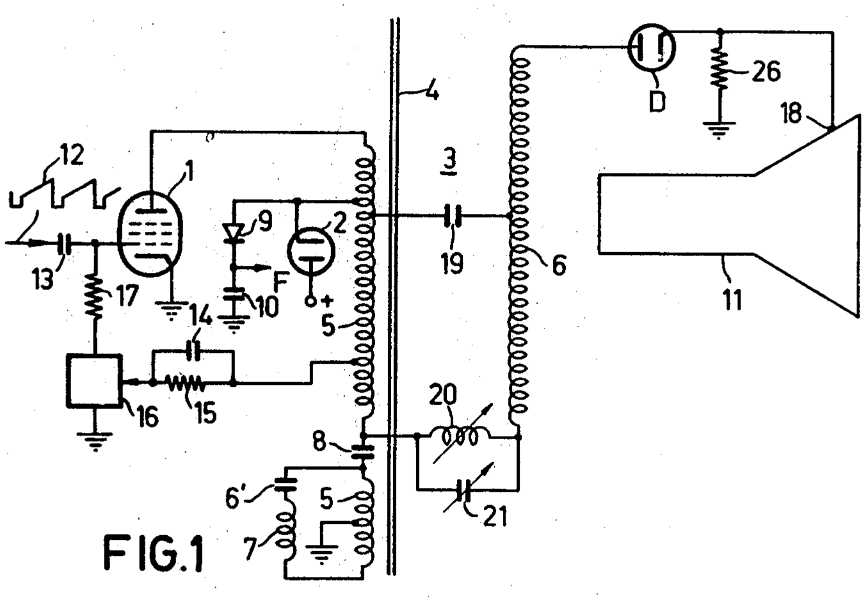

The system is further improved by winding the secondary winding of the output transformer so that it approximates a triangular configuration.

The present invention relates to television deflection circuits. More particularly, the invention relates to a circuit arrangement comprising switching means for periodically interrupting a current which is supplied to an induction coil, to which a deflection coil of a display tube may be connected in parallel. The voltage occurring across the coil upon interruption of said current is stepped up by means of a transformer and applied to a load circuit for generating an Extra High Tension (EHT). The total leakage inductance ($L_2$) of the transformer is chosen so that the current flowing through said leakage inductance ($L_2$) and the differential coefficient of said current are zero both at the instant of interruption and at the instant of reclosure of the current supply circuit. The network formed by the parallel arrangement of the primary inductance ($L_1$) and capacitor ($C_1$) of the transformer and the series arrangement of the leakage inductance ($L_2$), including a capacitor ($C_2$) operative in parallel therewith, and the total secondary capacitor ($C_3$), is chosen so that the two circle frequencies for parallel resinance $\alpha$, the fundamental harmonic, and $\gamma$, the higher harmonic, substantially satisfy the relation $$\frac{\gamma}{\alpha}=(2K+1)\left[1-\frac{4}{\pi^2}\cdot\frac{z}{1-z}\left\{1-\frac{1}{(2K+1)^2}\right\}\right]$$

wherein K is a constant to be chosen and $z$ is the ratio between the duration of the current interruption and the duration of the period.

Such a circuit arrangement is known from Dutch patent specification 88,020 and is further extensively described in the book, "Televisie," by F. Kerkhof and W. Werner, part 1, 3rd revised edition, 1963, particularly pages 452 through 462.

Furthermore it is known that the leakage inductance $L_2$ and the capacitor $C_2$ operative in parallel therewith (see FIGURE 13.1–9 on page 452 of the book "Televisie" which is substantially the same as FIGURE 3 of the present application) between primary and secondary of the transformer forms the so-called second internal resistance or the EHT Ri which causes the generated EHT to vary upon variation of the load connected thereto. Particularly if this circuit arrangement is used in colour television receivers, it is of paramount importance that the generated EHT be kept as constant as possible or that at least the variations be kept within reasonable limits since color errors may occur as a result of large variations in said EHT.

However, even in monochrome television receivers it is important to keep this EHT within the desired limits since large variations thereof cause the picture dimensions to vary and also the focussing of the beam current in the display tube does not remain satisfactory. This is all the more so because the focus voltage is also comparatively high in modern receivers and hence is also derived either from the primary or from the secondary of the relevent circuit arrangement. If said focus voltage is derived from the secondary, the variations in the focus voltage must not be too great, and if the focus voltage is derived from the primary, the variations in the generated EHT, which is applied to the final or acceleration anode of the display tube, must not be too great relative to the focus voltage on the primary side.

The remedy to all this has been either to use a ballast tube or to use separate circuits to generate the deflection current which flows through the deflection coil and the EHT. Both solutions are costly and require many extra components.

The use of a ballast tube involves much energy to be dissipated therein which energy must previously be supplied by the circuit arrangement. This is a waste of energy. In addition, there is the risk of X-ray radiation by the ballast tube, which must be screened by a lead cylinder.

It will be evident that the separate generation of deflection current and EHT is costly if it is considered that actually everything must be doubled.

It is therefore an object of the present invention to generate an EHT which is free from spurious oscillations by means of a single circuit arrangement which supplies both the deflection current and an EHT varying within the admissible limits, while adding as few switching elements as possible. To this end the circuit arrangement is characterized in that in order to obtain an internal EHT resistance ($R_i$) which is as low as possible, K is chosen to be even, that is to say, 2, 4, 6, etc., while the leakage inductance ($L_2$) and the capacitor ($C_2$), operative in parallel therewith, are given such values that the ratio of the circle frequency $\delta$ for the parallel resonance of said leakage inductance ($L_2$) and capacitor ($C_2$), and the fundamental harmonic circle frequency $\alpha$ assume values which may lie between a lower limit of about $$\frac{\delta}{\alpha}\cong 0.95\sqrt{\frac{\gamma^2}{\alpha^2}+\frac{\gamma}{\alpha}+1}$$

and an upper limit of about $$\frac{\delta}{\alpha}=2\sqrt{\frac{\gamma^2}{\alpha^2}+\frac{\gamma}{\alpha}+1}$$

The invention is based on the following two novel concepts.

The first concept is that due to said choice of K, the pulses derived from the secondary of the transformer vary more smoothly in the region where the EHT rectifier diode is conducting. Upon increasing load the conductivity time of said EHT diode can therefore increase (greater load) without the voltage level of the pulse strongly decreasing. This will be clarified hereinatfer with reference to the figures.

The second concept is that this smoothness can be adjusted at will with the aid of the ratio $\delta/\alpha$. This second concept also will be further clarified hereinafter.

It is to be noted that the first fact, although on erroneous grounds, is known per se from German patent specification 767,678. In fact, in this patent specification reference was made to the so-called third harmonic tuning ($K=1$) in which the secondary voltage $V_{C3}$ does not have the form as shown by curve C in FIGURE 2*a* of this German patent specification, but rather the form as shown in FIGURE 13.1–12.*b* on page 455 of the book "Televisie." As is shown by FIGURE 13.1–12*b* the secondary voltage $V_{C3}$, on the contrary, is actually very unfavourable for third harmonic tuning because it has a steeper peak than the pulse which occurs for first harmonic tuning, that is to say, if there were no leakage inductance $L_2$ at all.

It may therefore be assumed that a circuit arrangement without a leakage inductance, the so-called first harmonic tuning, is more favourable as regards the high-voltage $R_i$ than a circuit arrangement of so-called third harmonic tuning. It will be shown hereinafter with the aid of curves that, if the factor $\delta/\alpha$ and the factor $\beta/\alpha$ (still to be clarified) are correctly proportioned, the EHT $R_i$ for the so-called fifth harmonic tuning ($K=2$) is more favourable than that for the first harmonic tuning, and hence much more favourable than for third harmonic tuning.

Figures 2, 3:
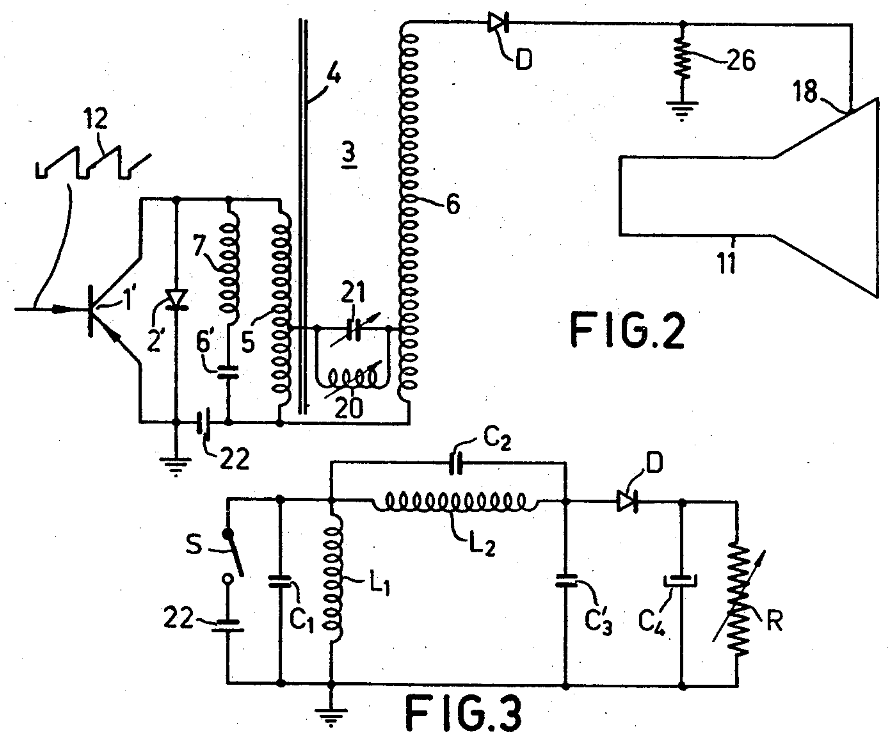
Figures 4, 5:
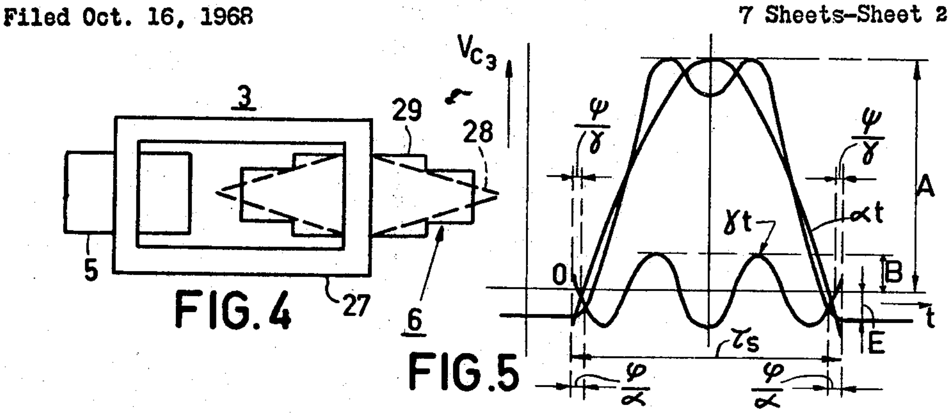
Figure 6:
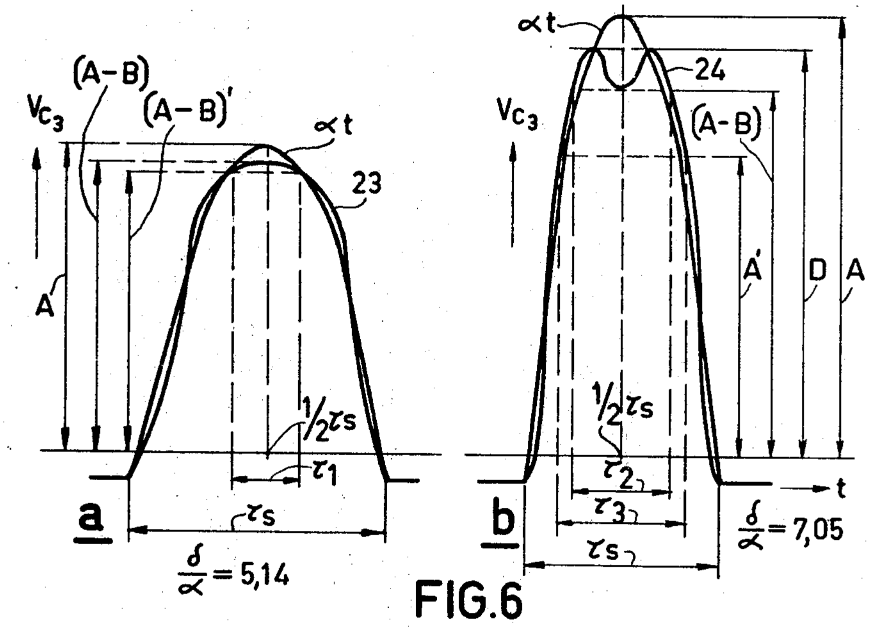
Figure 7:
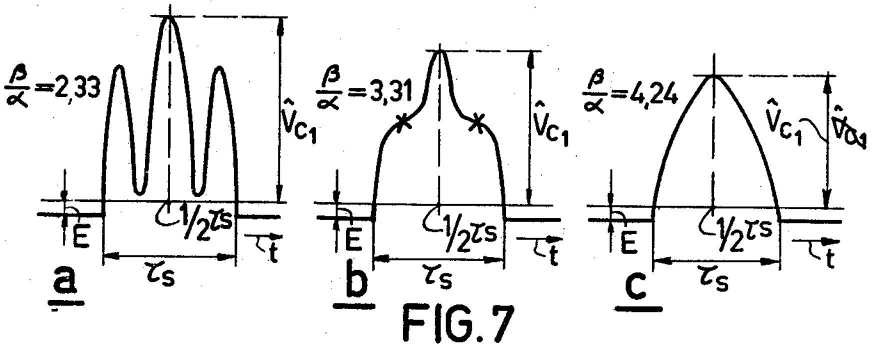
Figures 12, 14:
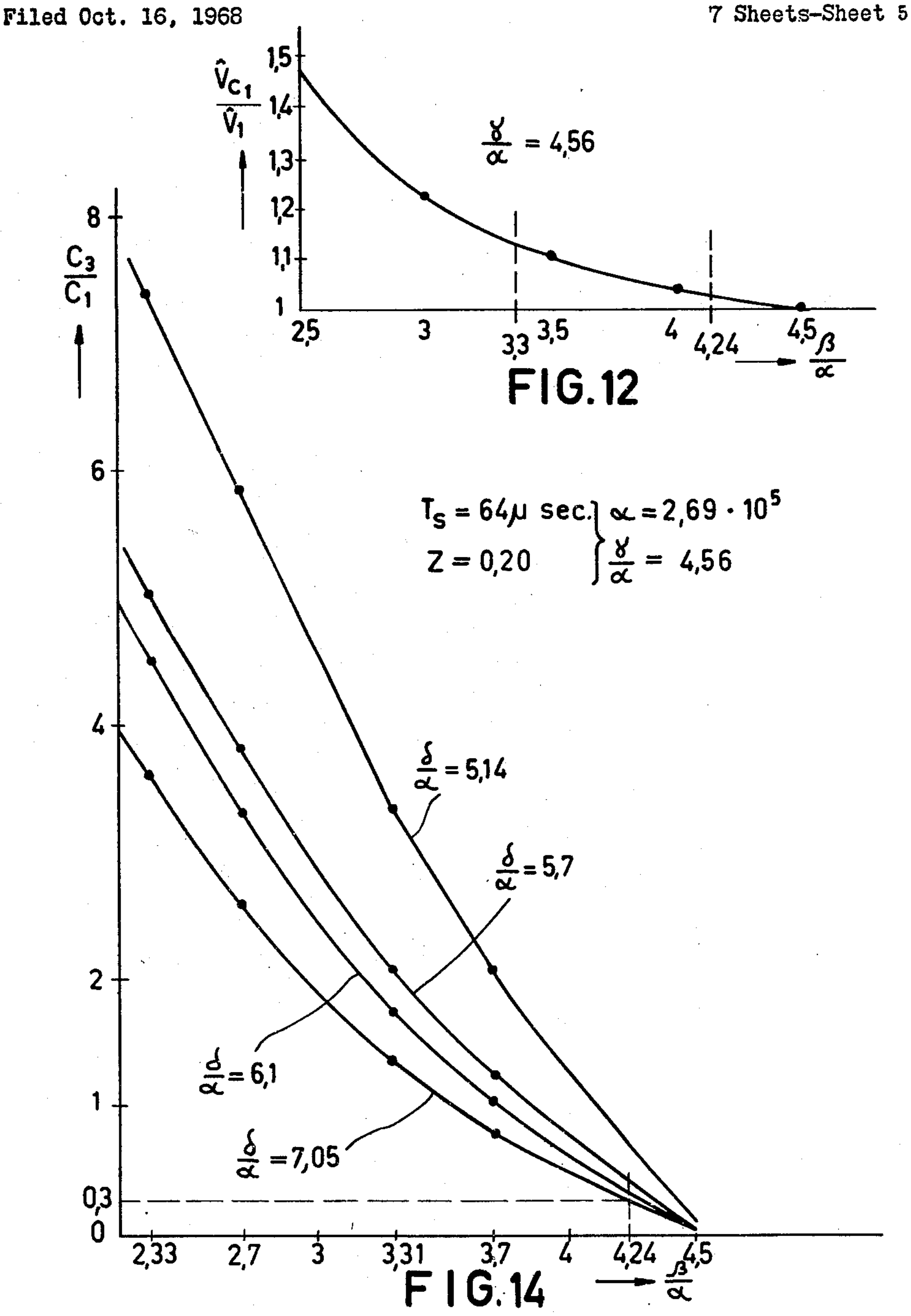
Figure 13:
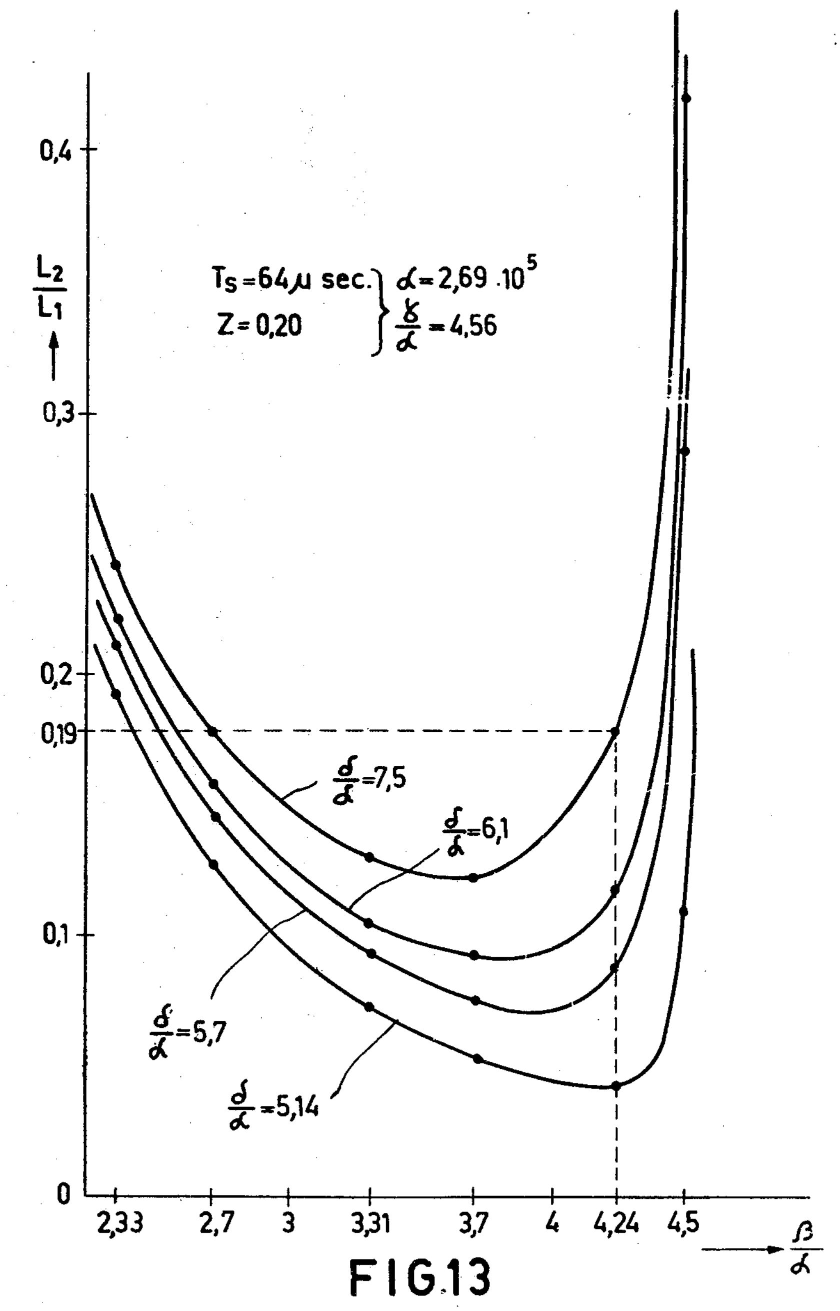
Figure 15:
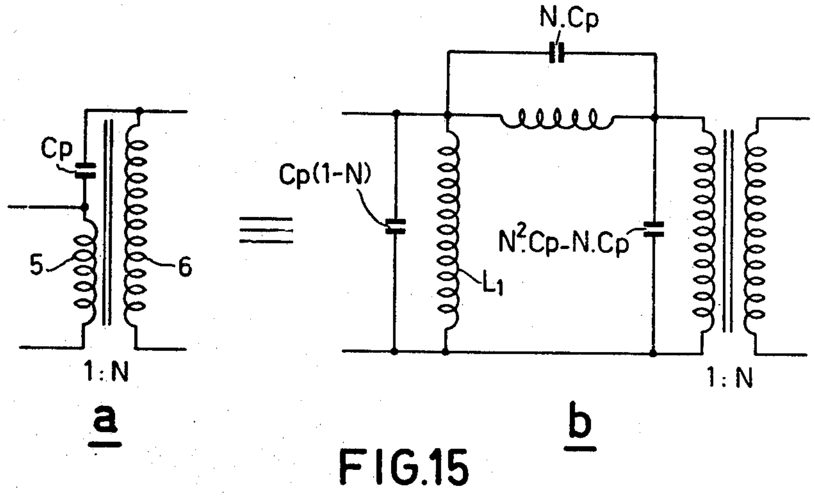
Figure 16:
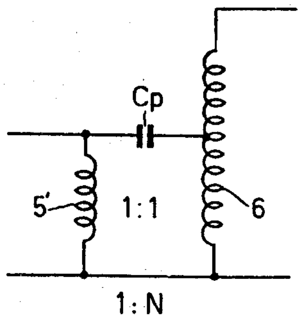

In order that the invention may be readily carried into effect it will now be described in detail, by way of example, with reference to the accompanying drawings, in which:

FIGURE 1 shows a first embodiment of the circuit arrangement which is provided with a series booster diode and is designed with tubes, FIGURE 2 shows a second embodiment of the circuit arrangement which is provided with a shunt efficiency diode and is designed with semiconductors, FIGURE 3 is the equivalent diagram of the circuit arrangements of FIGURES 1 and 2, FIGURE 4 is a possible embodiment of the transformer as used in the circuit arrangements of FIGURES 1 and 2, FIGURE 5 shows the pulsatory voltage $V_{C3}$ which occurs at the secondary of the transformer during interruption of the current, FIGURE 6 shows the pulsatory voltage $V_{C3}$ for two different proportionings of the transformer; this FIGURE also serves to clarify the fact that a small EHT $R_i$ can be obtained as a result of said proportioning, FIGURE 7 shows the pulsatory voltage $V_{C1}$ which occurs at the primary of the transformer during the interruption time of the current, FIGURES 8 to 11 show different curves which indicate the variation of the generated EHT $V_h$ relative to the no-load voltage $V_{h0}$ as a function of the beam current $i_s$ flowing through a display tube having a final anode supplied with the EHT $V_h$, FIGURE 12 shows a curve indicating the variation of the primary peak voltage $\hat{V}_{C1}$ for the so-called fifth harmonic tuning relative to the primary peak voltage $\hat{V}_1$ for the so-called first harmonic tuning as a function of different proportionings of the transformer, FIGURE 13 shows a curve which indicates the variation of the leakage inductance $L_2$ between primary and secondary of the transformer relative to the primary inductance $L_1$ as a function of different proportionings of the transformer, FIGURE 14 shows a curve indicating the variation of the secondary capacitance $C_3$ relative to the primary capacitance $C_1$ as a function of different proportionings of the transformer FIGURE 15*a* shows the transformer in itself including an additionally connected capacitor $C_p$ in order to obtain the required capacitor $C_2$ which is operative in paralllel with the leakage inductance $L_2$, FIGURE 15*b* shows the equivalent diagram of thetransformer including said additionally connected capacitor $C_p$ of FIGURE 15*a*, and FIGURE 16 shows a further diagram indicating how, according to a further principle of the invention, the capacitor $C_p$ must be co-connected.

It should be noted that the symbols used in the following description are the same as those used in the book "Televisie."

FIGURE 1 shows a circuit arrangement for generating the line deflection current for a television display tube. In this figure there is shown a line output tube 1 and the series booster diode 2, both of which are connected to a line output transformer 3 which is provided with a core 4, a primary 5 and a secondary 6. The line deflection coil 7 is connected to the lower winding of the primary 5 through a capacitor 6'. The so-called booster capacitor 8 is located between the two parts of the winding 5. Furthermore a diode 9, which is grounded through a capacitor 10, is connected to the primary. The focus voltage F is derived from the junction of capacitor 10 and diode 9. This voltage is applied to the focussing electrode of the display tube 11.

The output pentode 1 is controlled by means of a sawtooth control signal 12 which is applied through a capacitor 13 to the control grid of tube 1. The parallel arrangement of a capacitor 14 and a resistor 15 is connected to the primary 5. This arrangement applies a control voltage from the primary 5 to the control circuit 16 which in turn delivers a control voltage through the gridleak resistor 17 to the control grid of the tube 1. This type of tube control is well known in the art. Consequently the pentode 1, the series-booster diode 2 and the control circuit 16 can be considered to be a voltage source which will try to keep the deflection energy as constant as possible, or to keep the variations within reasonable limits. For example, it is possible to use the known principle that the relative variation of the deflection current $I_d$ is equal to half the relative variation of the EHT $V_h$ in accordance with the equation $$\frac{\Delta I_d}{I_d}=\frac{1}{2}\frac{\Delta V_h}{V_h}$$

Also in the latter case a minimum EHT $R_i$ will be of paramount importance since then the variations $\Delta V_h$ are as small as possible. As already described in the preamble, the cause of said variations $\Delta V_h$ resides in the existence of the impedance between primary 5 and secondary 6. This impedance is indicated in FIGURE 3 by the leakage inductance $L_2$ and the capacitor $C_2$ operative in parallel therewith.

The required EHT for the final anode 18 is obtained from the voltage pulses which occur at the primary 5 during the interruption of the current produced when pentode 1 and diode 2 are both cut off. These pulses are stepped up by means of the secondary 6 and subsequently rectified by the EHT diode D. The rectified voltage can be applied to the final anode 18 of the display tube 11.

Furthermore, FIGURE 1 shows that the primary 5 is partly directly coupled to the secondary 6 by means of a large capacitor 19 at one end and by means of a parallel arrangement comprising an adjustable induction coil 20 and a variable capacitor 21. The significance of the connection through the components 19, 20 and 21 primary 5 to secondary 6 will be described hereinafter.

The circuit arrangement of FIGURE 2, in which corresponding components have the same reference numerals as those in FIGURE 1, only differs from FIGURE 1 in that a shunt efficiently diode 2' is used instead of a series booster diode 2, while the pentode 1 is replaced by a transistor 1'. In connection therewith the configuration of the circuit arrangement of FIGURE 2 is slightly different from that of FIGURE 1. The supply voltage for the entire circuit arrangement of FIGURE 2 is provided by the DC voltage source 22.

FIGURE 3 shows the equivalent diagram of the circuit arrangements of FIGURE 1 and 2. Here again the DC voltage source 22 provides the supply voltage for the circuit arrangement. The switch S is the substitute for either the pentode 1 and series booster diode 2 or for the transistor 1' and shunt efficiency diode 2'. Furthermore, FIGURE 3 shows the total inductance $L_1$ and capacitor $C_1$ being operative on the primary side. The leakage inductance is represented by inductor $L_2$ and the capacitor operative in parallel therewith by capacitor $C_2$.

In FIGURE 3 the load capacitor is indicated by $C'_3$ and thence the high-voltage diode D leads to the load circuit which is represented by a variable resistor R and a fixed capacitor $C_4$. Both resistor R and capacitor $C_4$ are actually formed by the display tube 11. That resistor R is variable resides in the fact that the beam current $i_s$, which flows through the display tube 11, is dependent on both the brightness control and on the controlling video signal and hence is subject to variations.

The diode D only conducts during part of the occurrence of the pulses and it will therefore be evident that the value of capacitor $C_4$ must partly be added to the value of the capacitor $C'_3$. The capacitor $C_3$ mentioned in the following calculations is therefore the total operative capacitor of the high-voltage load circuit.

Losses occurring when switch S is open are not taken into account in the equivalent diagram of FIGURE 3. It has, however, been found that such an approximation is by all means admissible.

For the equivalent diagram of FIGURE 3 it can be concluded that there are two parallel resonances which occur at circle frequency $\alpha$, being the fundamental harmonic, and at a second circle frequency $\gamma$, being the higher harmonic if the resistor R is infinitely great and the switch S is open. Said circle frequencies are given by the equation 13.1–24 on page 453 of the book "Televisie." Furthermore, it can be concluded that these circle frequencies can also be given by the equation 13.1–34 on page 454. With the aid of the equation 13.1–34 and the equation 13.1–36 it can be concluded that for the ratio $\gamma/\alpha$ of the two circle frequencies, it approximately applies that:

$$\frac{\gamma}{\alpha}=(2K+1)\left[1-\frac{4}{\pi^2}\cdot\frac{z}{1-z}\left\{1-\frac{1}{(2K+1)^2}\right\}\right] \qquad (1)$$

Furthermore, it can be calculated, with the aid of FIGURE 3, that the secondary voltage $V_{C3}$ for the unloaded high voltage ($R=\infty$) is given by:

$$V_{C3}=A\sin(\alpha t-\varphi)-B\sin(\gamma t-\psi) \qquad (2)$$

The shape of this pulsatory voltage is shown in FIGURE 5 for $K=2$, that is to say, for so-called fifth harmonic tuning, or in other words if the higher harmonic $\gamma$ is approximately five times higher than the fundamental harmonic $\alpha$. The actual ratio between $\gamma$ and $\alpha$ is, however, less than 5 and is dependent on the value $z$ as appears from Equation 1. For a practical value at which $z=0.20$ (that is to say, 20% flyback time for the line deflection current) it can be calculated, with the aid of Equation 1, that $\gamma/\alpha=4.56$.

The behaviour of the fundamental harmonic $\alpha$ as a function of the time $t$ during the flyback time $\tau_s$ (duration of the interruption of the current) is shown by the curve $\alpha t$ in FIGURE 5. Said fundamental harmonic oscillation has an amplitude A which is given by:

$$A=\frac{E}{\sin\varphi}\frac{\gamma^2(\delta^2-\alpha^2)}{\delta^2(\gamma^2-\alpha^2)} \qquad (3)$$

The behaviour of the higher harmonic $\gamma$ as a function of time $t$ during the time $\tau_s$ is shown by the curve $\gamma t$ in FIGURE 5. Said higher harmonic oscillation has an amplitude B which is given by:

$$B=\frac{E}{\sin\psi}\frac{\alpha^2(\delta^2-\gamma^2)}{\delta^2(\gamma^2-\alpha^2)} \qquad (4)$$

The angles $\varphi$ and $\psi$ from the Equations 2, 3 and 4 are shown in FIGURE 5, as well as the supply voltage E which is provided by the source 22.

The circle frequency $\delta$ occurring in the Equations 3 and 4 is determined by the parallel resonance of the circuit formed by the leakage inductance $L_2$ together with the capacitor $C_2$ in parallel therewith so that:

$$\delta=\frac{1}{\sqrt{L_2C_2}} \qquad (5)$$

An object of the invention is to give the voltage $V_{C3}$ a peak which is as smooth as possible in accordance with the first concept mentioned in the preamble. This is only possible if K is chosen to be even, that is to say, 2, 4, 6, etc. In fact, for K=odd, that is to say, 1, 3, 5, etc., the higher harmonic oscillation $\gamma$ at $\frac{1}{2}\tau_s$, that is to say, at the middle of the flyback period, always shows a positive peak. It follows that if K is odd, something is always added to the fundamental harmonic in the middle of the flyback time $\tau_s$ (thus in the middle the value $(A+B)$ is always obtained) and something is subtracted from the fundamental harmonic on either side of this instant, It is therefore impossible to keep the voltage $V_{Cs}$ as smooth as possible if K is odd. However, if K is even, the amplitude A of the fundamental harmonic is reduced exactly in the middle of the flyback period ($\frac{1}{2}\tau_s$) and enlarged on either side thereof.

This reduction in the middle must, however, not go too far since otherwise peaks are produced again due to enlarging on either side of said middle, as is shown in FIGURE 5. The EHT diode D would then respond to the first pulse and since an attenuated oscillation is concerned, the other peaks would fall too. Thus there would not be much improvement relative to the situation where the peak is in the middle.

According to the second concept of the invention, it is possible to give the amplitude A of the fundamental harmonic $\alpha$ such a value relative to the value of the amplitude B of the higher harmonic, by means of the ratio $\delta/\alpha$, that indeed the above-mentioned smooth variation is satisfied.

This can be proved as follows.

It follows from Equation 2 that for $(\alpha t-\varphi)$ and $(\gamma t-\psi)=90°$, that is to say, at the midpoint ($\frac{1}{2}\tau_s$) of the flyback time $\tau_s$, the voltage $V_{C3}$ has a minimum value which is given by $$V_{C3}=A-B \qquad (6)$$

Extreme values occur when the first derivative with respect to time $t$ of the voltage $V_{C3}$ is zero. Consequently:

$$\frac{dV_{C3}}{dt}=-A\alpha\cos(\alpha t-\varphi)-B\gamma\cos(\gamma t-\psi)=0 \qquad (7)$$

From which follows:

$$\frac{\cos(\alpha t-\varphi)}{\cos(\gamma t-\psi)}=\frac{B\gamma}{A\alpha}$$

As shown in FIGURE 5, three extreme values, or more if $K=4, 6 \ldots$, occur in the interval $\tau_s$. These extreme values will coincide thus form one peak if the second derivative of voltage $V_{C3}$ also becomes zero. Consequently:

$$\frac{d^2V_{C3}}{dt^2}=-A\alpha^2\sin(\alpha t-\varphi)+B\gamma^2\sin(\gamma t-\psi)=0 \qquad (8)$$

This can only occur at the same points as that where the minimum occurs, that is to say, for: $\alpha t-\varphi=90°$ and $\gamma t-\psi=90°$.

It then follows from Equation 8 that $$A\alpha^2=B\gamma^2$$

With the aid of the latter equation and with the aid of the Equations 3 and 4, in which with some approximation there can be written for $\sin\psi\approx\psi$ and for $\sin\varphi\approx\varphi$ (small angles) and hence $$\frac{\psi}{\varphi}=\frac{\alpha}{\gamma}$$

It is found that:

$$\frac{\delta}{\alpha}=\frac{\gamma^2}{\alpha^2}+\frac{\gamma}{\alpha}+1 \qquad (9)$$

If the previously determined value of $\gamma/\alpha=4.56$ is substituted in Equation 9 when it is found that $\delta/\alpha=5.14$.

In FIGURE 6*a* the secondary voltage $V_{C3}$ is indicated by curve 23 for this case. In this figure the curve $\alpha t$ is also shown for the first harmonic tuning, in which for $\alpha$ the value of $$\alpha=2.69.10^5 \text{ c./s.}$$

is taken for a value of $z=0.20$ in the C.C.I.R. system of 625 lines per image ($f\alpha$=the line flyback frequency and of course $\alpha=2\pi f\alpha$).

FIGURE 6*a* also shows the gain which is achieved by reducing the EHT $R_i$. In fact, at no-load the generated no-load voltage $V_{h0}$ is equal to A if pure first harmonic tuning were used. If the load increases, that is to say, beam current $i_s$ flowing through display tube 11 increases, or if R (FIGURE 3) is reduced, diode D must convey current during the time $\tau_1$ and the voltage decreases from $V_{h0}\rightarrow A$ to $V_h\rightarrow(A-B)'$.

If, however, fifth harmonic tuning is used, it can be seen that the no-load voltage $V_{h0}$ is given by A—B and that the EHT only decreases to a value $V_h$ corresponding to (A—B)′.

Figures 8, 9:
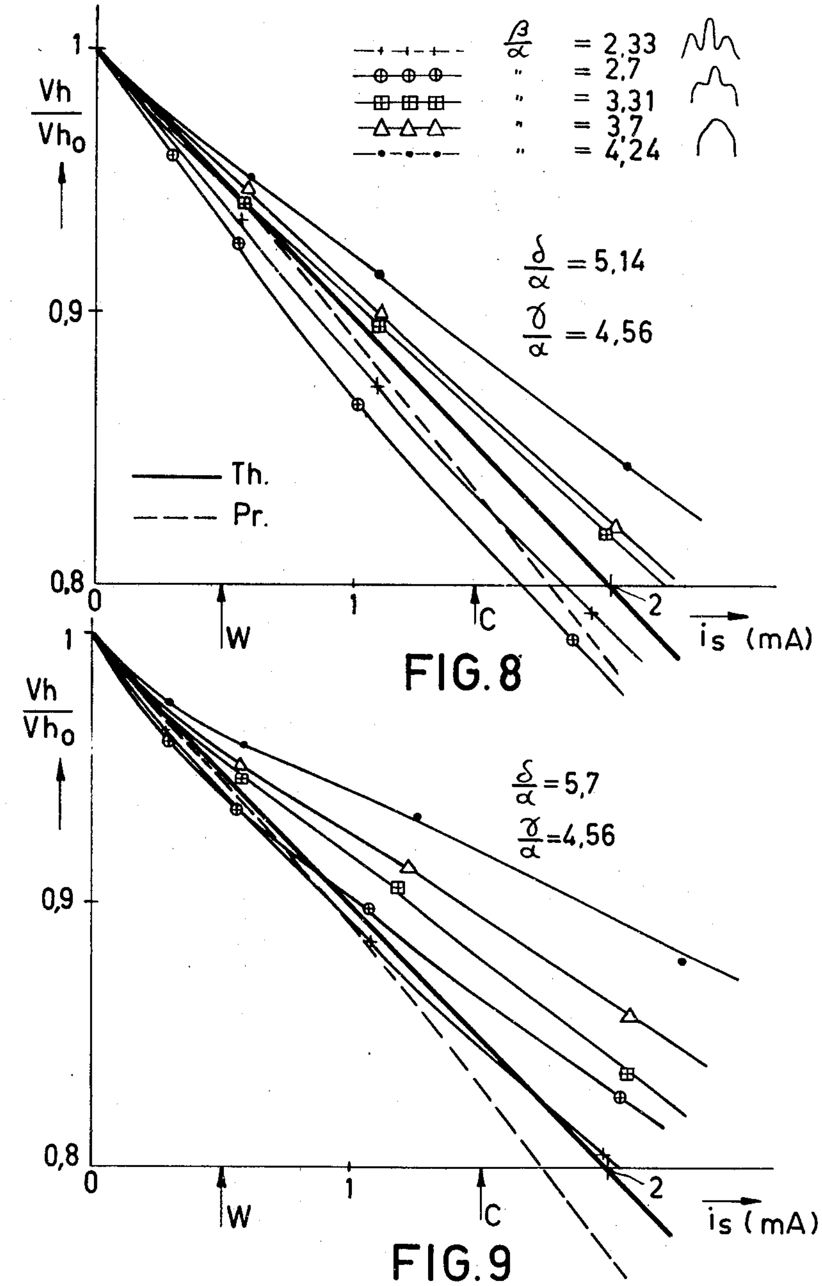

To clarify all this the measured ratio of the loaded high voltage $V_h$ relative to the no-load voltage $$V_{h0}\rightarrow\left(\frac{V_h}{V_{h0}}\right)$$

is plotted in FIGURE 8 as a function of the beam current $i_s$ with the factor $\beta/\alpha$ as a parameter. In this figure $\beta$ is the series reconant circle frequency of the network according to FIGURE 3, when switch S is open. The significance of the factor $\beta/\alpha$ will further be dealt with hereinafter. Here it is only to be noted that as the factor $\beta/\alpha$ increases the curves acquire a smoother variation, which is desirable.

The thick solid-line curve in FIGURE 8, indicated by T*h*, further shows the theoretical behaviour of the EHT in the case of pure first harmonic tuning. The broken-line curve P*r* shows this behaviour in the case of pure first harmonic tuning for the practical case.

The curves for fifth harmonic tuning are indicated by the thin solid lines. It can be seen that especially for $\beta/\alpha=4.24$, a considerable improvement is obtained relative to the practical curve (P*r*) for first harmonic tuning.

If a higher value for $\delta/\alpha$ is taken the EHT $R_i$ is further decreased. This is shown by the further curves of FIGURES 9, 10 and 11, and can be explained by the fact already referred to hereinbefore of the peak of the voltage $V_{C3}$ then being flattened. This can further be explained with the aid of FIGURE 6*b*, where the voltage $V_{C3}$(at $\gamma/\alpha=4.56$) is given for $\delta/\alpha=7.05$.

The curve 24 shows the voltage $V_{C3}$ for fifth harmonic tuning, the curve $\alpha t$ shows the voltage for first harmonic tuning.

At fifth harmonic tuning it can be seen that the high voltage decreases from D at no-load to $(A-B)$ at a certain load. Said decrease is considerably less than that at first harmonic tuning where a decrease occurs from A to A′. This can be explained in that the pulse 24 is wider at its upper end than the pulse $\alpha t$ so that the diode D can convey current already during a considerable time $\tau_2$ at a higher voltage $(A-B)$ than for the case of first harmonic tuning when diode D is operative at a lower voltage A′ during a time $\tau_3$. It appears therefrom that not only the smoothing at the upper side, but also the widening of the side edges at higher values for $\delta/\alpha$ adds to the decrease of the EHT $R_i$.

It is to be noted in this respect that fifth harmonic tuning (thus $K=2$) is better than the 9th, 13th or still higher harmonic tuning. In fact, at the fifth harmonic the first maxima lie further from the centre than at still higher harmonics, so that both the smoothing of the pulse $V_{C3}$ and the widening of its edges is better. Consequently, for $K$=even, the choice $K=2$ is to be preferred because the smallest EHT $R_i$ is obtained thereby.

It is further to be noted that it is true that the generated no-load high voltage $V_{h0}$ in the case of fifth harmonic tuning is lower than with first harmonic tuning. In FIGURE 6*a*, $A-B$ is smaller than A and in FIGURE 6*b*, D is smaller than A and hence certainly lower than with third harmonic tuning. This, however, is no drawback because the required value of high voltage can still be obtained by providing more turns on the secondary 6 while maintaining the same valve of $\gamma/\alpha$, $\delta/\alpha$ and $\beta/\alpha$.

Figures 10, 11:
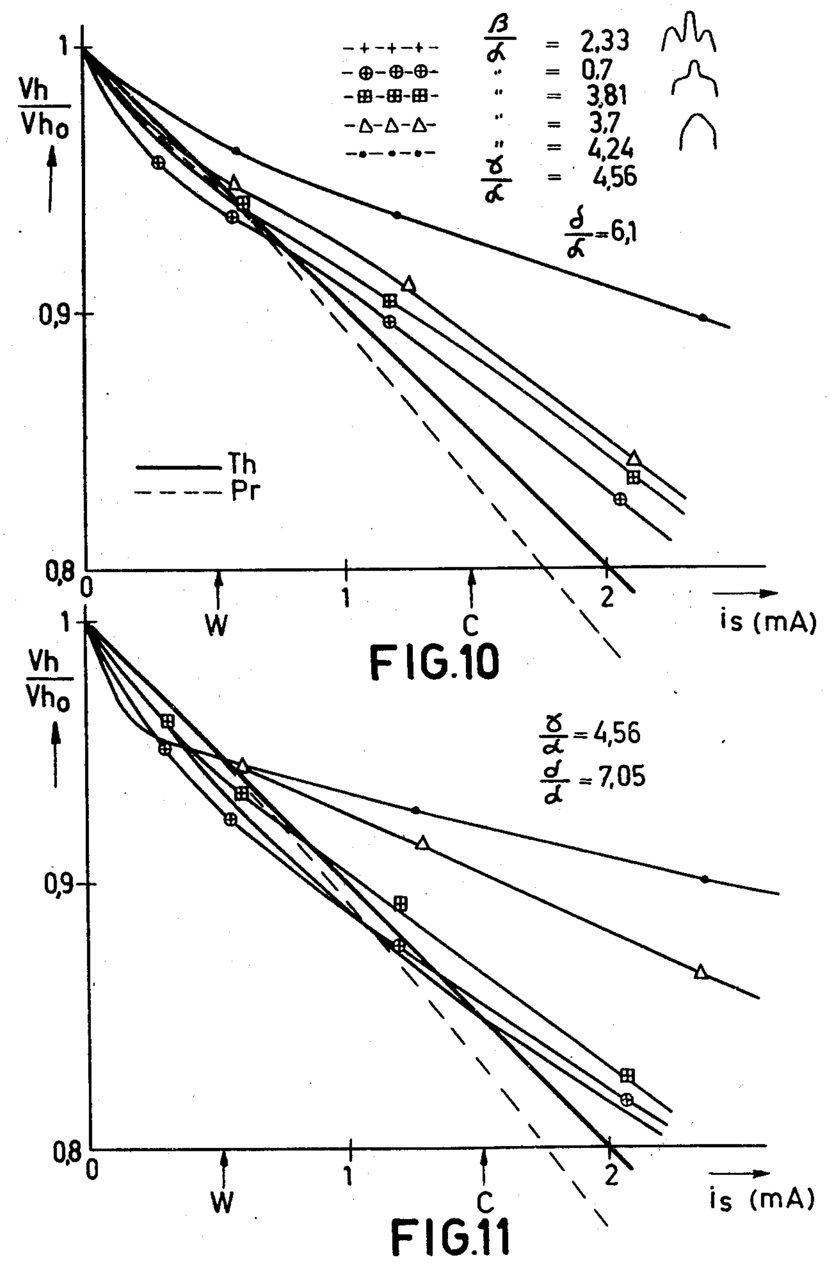

The variation of $V_{h0}$ as a function of the beam current $i_s$ for $\delta/\alpha=7.05$ is shown in FIGURE 11, with $\beta/\alpha$ as a parameter. As in FIGURES 8, 9, and 10 it is here assumed that the no-load voltage $V_{h0}$ is the same for the first and fifth harmonics, which can be achieved, as mentioned above, by giving winding 6 the required number of turns.

FIGURE 11 shows that the total gain at greater beam current $i_s$ is great, for example, at 2 ma. a decrease of only 9% relative to no-load occurs, in contrast to the case of FIGURE 8 where a corresponding decrease of 15% occurs. The improvement relative to the first harmonic tuning is still greater and amounts to as much as 23% at 2 ma.

FIGURE 11 also shows that for a small beam current a sharp kink occurs in the curve for $\beta/\alpha=4.24$. This can also be explained with reference to FIGURE 66. In fact, at no-load the voltage D lies at the peaks of the voltage $V_{C3}$. If, starting from the no-load condition, the load increases then these peaks must be consumed up first before the diode D can act in the wide part of the pulse $V_{C3}$. Hence only a small increase of load will result in a quick decrease of the voltage from D to $A-B$. With further increasing load the voltage will then only decrease to a slight extent. This is clearly shown by the curve of FIGURE 11, for $\beta/\alpha=4.24$, which strongly decreases up to approximately 0.3 ma. and then has a rather flat course. For example, in the case of a colour television display tube, which can have beam currents of up to approximately 1.5 ma., the large drop at the beginning could be overcome by connecting a bleeder resistor 26 (see FIGURES 1 and 2) from the diode D to ground, which resistor constantly draws a current of 0.3 ma. The decrease of the EHT $V_h$ in case of an increase up to 2 ma. is then very slight. Of course this has the drawback that a power of approximately 25 kv. (the output anode voltage required for colour television display tubes) multiplied by 0.3 ma. is 7.5 watts is dissipated in the bleeder 26. This is, however, much less than the 40 watts in a ballast tube and in addition there is no longer the problem of X-ray radiation. AVDR (voltage-dependent resistor) is preferably used for this purpose. This may have a robust construction and in addition it has the advantage that it has a stabilizing effect.

Otherwise the use of a bleeder is not strictly necessary. When choosing $\delta/\alpha=6.1$ the EHT has a course as shown in FIGURE 10. At $\beta/\alpha=4.24$, this curve has substantially the same total drop as the corresponding curve in FIGURE 11 but does not show the kink at the beginning.

This then involves two questions.

(1) Which choice of $\delta/\alpha$ goes with a certain kind of receiver.

(2) How far must one go in increasing $\delta/\alpha$ which always results in an increase of the maximum values relative to the minimum $A-B$, which in turn results in a sharp kink at the beginning of the load line for $V_h/V_{h0}$.

In order to answer the first question, FIGURES 8, 9, 10 and 11 show little arrows at the current axis indicated by W and C. The position of the arrow indicated at W is approximately 0.5 ma. and indicates that this is substantially the highest average beam current $i_s$ which will flow in the display tube 11 of a monochrome receiver. It will be evident that for such a receiver the curves of FIGURE 11 for $\beta/\alpha=4.24$ and $\beta/\alpha=3.7$ are not usable since exactly in the effective range of 0 to 0.5 ma. a stronger voltage drop occurs than with first harmonic tuning. For such a receiver, for example, the curve of FIGURE 10 or that of FIGURE 9, with $\beta/\alpha=4.24$ is much better.

The position of the arrow indicated by C is at approximately 1.5 ma. and indicates that this is substantially the highest average beam current $i_s$ which will flow in the display tube 11 of a colour television receiver.

For such a receiver the curve of FIGURE 11 with $\beta/\alpha=4.24$ is indeed to be preferred.

It follows from the above that the precise choice of $\delta/\alpha$ is greatly dependent on the type of display tube 11 which is used so that for different receivers a certain range of $\delta/\alpha$ is desirable between lower and upper limits at substantially the same value of $\beta/\alpha$.

The second question is already partly answered in connection with the remarks for FIGURES 6*b* and 11. In fact, too great a kink in the curve $V_h/V_{h0}$ at increasing load from the position of no-load becomes inpermissible in the long run. In fact, as already stated, this is a result of too high maximum values in the voltage $V_{C3}$ relative to the minimum value $A-B$.

It has been found that a rather reasonable EHT $R_i$ can be obtained, especially for colour television receivers, if:

$$\frac{\delta}{\alpha}\cong 2\sqrt{\frac{\gamma^2}{\alpha^2}+\frac{\gamma}{\alpha}+1} \qquad (10)$$

It can therefore be assumed that the value of $\delta/\alpha$ as regards lower limit should lie about a value $$\frac{\delta}{\alpha}=\sqrt{\frac{\gamma^2}{\alpha^2}+\frac{\gamma}{\alpha}+1}$$

and also a value of $\delta/\alpha=0.95$ $$\sqrt{\frac{\gamma^2}{\alpha^2}+\frac{\gamma}{\alpha}+1}$$

is found to be still satisfactory. Said lower limit is also determined by the fact that the amplitude B (see Equation 4) must not become negative. Otherwise a transformer 3 which could not be realized would be the result in connection with the choice to be referred to hereinafter of the series resonant circle frequency $\beta$.

The upper limit lies, as already stated, at approximately the value $$\frac{\delta}{\alpha}\cong 2\sqrt{\frac{\gamma^2}{\alpha^2}+\frac{\gamma}{\alpha}+1}.$$

In the foregoing it has always been assumed that not only the factor $\delta/\alpha$ but also the factor $\beta/\alpha$ is of essential importance for obtaining a low EHT $R_i$. This can be explained as follows: In fact, the factor $\beta/\alpha$ exclusively determines the shape and the peak value of the primary voltage $\hat{V}_{C1}$. As FIGURE 7 shows the primary peak voltage $\hat{V}_{C1}$ is high in the middle ($\frac{1}{2}\tau_s$) of the current interruption time $\tau_s$. At a small value of $\beta/\alpha$, namely $\beta/\alpha=2.33$ (see FIGURE 7*a*) this peak voltage is higher than at $\beta/\alpha=3.31$ (see FIGURE 7*b*) and the latter in turn is higher than that associated with $\beta/\alpha=4.24$, (see FIGURE 7*c*).

Now the diode D draws current around the centre at $\frac{1}{2}\tau_s$ of the flyback time $\tau_s$. If most energy is stored about this centre in the capacitors $C_2$ and $C_3$, diode D can directly derive this energy from said capacitors. If, however, much energy were stored in capacitor $C_1$ this energy would again have to be applied through the elements $L_2$ and $C_2$ in case of conducting diode D, which means an additional voltage drop.

The energy stored in capacitor $C_1$ is as small as possible around the instant $\frac{1}{2}\tau_s$ if also the voltage across it is as low as possible (the minimum possible charge of capacitor $C_1$). By rendering $\beta/\alpha$ as large as possible, $\hat{V}_{C1}$ is rendered as small as possible and hence the EHT $R_i$ is as small as possible as is shown by the curves of FIGURES 8, 9, 10 and 11.

The same is once more explained with reference to FIGURE 12, where the ratio $\hat{V}_{C1}/\hat{V}_1$ is plotted as a function of $\beta/\alpha$. Therein $\hat{V}_{C1}$ is again the primary peak voltage at fifth harmonic and $V_1$ is the primary peak voltage at first harmonic tuning.

Here it also appear that $\hat{V}_{C1}$ becomes as small as possible at the maximum possible $\beta/\alpha$.

It is of course impossible to make the series resonant circle frequency $\beta$ higher than the higher harmonic parallel resonant circle frequency $\gamma$. For practical reasons it is thus impossible to have $\beta/\alpha$ increase to an unlimited extent. However, $\beta/\alpha$ can approach $\gamma/\alpha$ as closely as posible. This means that $\beta$ must approach the value of $\gamma$ as closely as possible. In practice it is found that for $K=2$ and $\gamma/\alpha=4.56$ a good value of $\beta/\alpha=4.24$.

In FIGURE 14 the ratio of the EHT capacitor $C_3$ relative to the primary capacitor $C_1$ is plotted as a function of $\beta/\alpha$. It can be seen that for the chosen value of $\beta/\alpha=4.24$ the ratio $C_3/C_1$ becomes small. For $\delta/\alpha=7.05$ it can be seen that $C_3/C_1$ has become 0.3. In other words the EHT capacitor $C_3$ must be 0.3 of the value of the primary capacitor $C_1$. It is found in practice that with the required value of the leakage inductance $L_2$ to be referred to hereinafter, the value of capacitor $C_3$ feasible with the conventional winding methods is too high to satisfy the ratio of 0.3 mentioned hereinbefore. According to a further embodiment of the principle of the invention, one has therefore changed over to a winding method of the secondary winding 6, as is shown in FIGURE 4. This figure exclusively shows the construction of the transformer 3. This transformer has a primary 5 and a secondary 6, which are wound on a core 27. It can be seen that the winding 6 may be wound stepwise (solid line 29) or the so-called triangular winding may be used (broken line 28). It can be achieved with this winding method that both the leakage inductance $L_2$ and the EHT capacitor $C_3$ can be kept small. In fact, the EHT capacitor $C_3$ is also determined by the capacitor $C'_3$ as shown in FIGURE 3. The value of capacitor $C'_3$ is determined by the capacitance of the turns of winding 6 relative to transformer core 27, which in this respect can be considered to be connected to ground.

The requirement to obtain a small leakage inductance $L_2$ is that a coil which is extended as long as possible, is applied on the core 27. Part of the total leakage inductance between primary 5 and secondary 6 is formed by the inductance which arises because lines of force, starting from the winding 6 if this winding would draw current, do not pass through the core 27 and hence will not be surrounded by the primary 5. The total leakage inductance is formed by the leakage inductance defined above and added to the inductance which arises due to the number of lines of force which, starting from the winding 5 if this winding draws current, do not pass through the core 27. Since, however, the winding 6 has the greatest number of turns, it is important to wind this winding exactly in a manner such that a minimum possible leakage inductance $L_2$ is obtained therewith. With the same number of turns, a coil acquires the smallest leakage inductance when it is extended as long as possible. In fact, between a coil and the core onto which it is wound there is inevitably a certain layer of air. The number of lines of force which, starting from the coil, exclusively pass through this layer of air form the leakage inductance of this winding relative to the core. The rest of the lines of force, preferably the greatest number, pass through the core. The lines of force which pass through the layer of air will experience magnetic reluctance which, if the coil is short, is smaller than if the coil is long. In fact, the magnetic reluctance of a layer of air is greater than that of a core. Thus, if the coil is made long, the magnetic reluctance of the layer of air becomes great and thereby as many as possible lines of force are forced to pass through the core.

It follows that a long coil has less leakage inductance than a short coil. Hence the entire winding 6 is in fact applied in its most extended form on the core 27 in order to obtain a minimum possible leakage inductance $L_2$. A maximum extended winding 6 in turn has, however, the result that the EHT capacitor $C'_3$ and hence the total desired capacitance $C_3$ acquire a value that is greater than the value determined by the ratio of 0.3 mentioned hereinbefore. In order to obviate this drawback the winding 6 is would in such manner that the part which lies directly on the core 27 is extended as long as possible, while the turns on the top, that is to say, the part which is further removed from the core 27, are kept as short as possible. In fact, in operation, the turns on the top of the winding 6 receive the highest potential relative to the core 27 and will therefore add most to the formation of the capacitance $C'_3$. If the windings towards the top are thus made shorter, the distances of the turns on the top will be more and more remote from the core 27, and hence their capacitances will be decreased. The ideal method of winding would be a triangular winding as shown by the broken line 28 in FIGURE 4. The above-mentioned compromise of small leakage inductance $L_2$ and small high-voltage capactor $C_3$ associated therewith is then achieved best. However, with the available winding machines it is impossible to wind such a triangular winding. In practice, it is possible to wind in a stepwise manner as shown by the solid line 29. Comparison of the lines 28 and 29 indicates that the stepwise wound winding 29 is a fairly close approximation to the triangular winding 28. If necessary, the step shape may not be applied in two layers as shown in FIGURE 4, but also in three or four layers so that the triangular winding 28 is more closely approximated. In practice, it was found that a steplike winding, as shown by the line 29, already satisfied.

A second difficulty presents itself in obtaining a capacitor $C_2$ of the desired value at the correct value of the leakage inductance $L_2$ so as to be able to realize a ratio $\delta/\alpha=7.05$.

In FIGURE 13 the ratio of the leakage inductance $L_2$ relative to the primary inductance $L_1$ is plotted as a function of $\beta/\alpha$. For the curve $\delta/\alpha=7.05$ one finds that for $\beta/\alpha=4.24$ the ratio of said inductances must be $$L_2/L_1=0.19$$

For the value of $\alpha=2.69.10^5$ c./s. required for the CCIR system, one finds that $\delta=2.09.10^6$ c./s. In practice the primary inductance $L_1$ has a value of approximately 25 mH., so that with this last-mentioned datum and with the data mentioned hereinbefore, it is found that the capacitor $C_2$ which is operative in parallel with the leakage inductor $L_2$ must have a value of $C_2=83$ pf. Such a capacitance is too high to be obtained through a normal winding method. It is therefore necessary to add capacitance. This is a difficult problem, because this capacitance can only be added on the primary or on the secondary side, and must be done in a manner such that the capacitance operative in parallel with the leakage inductance $L_2$ is increased while neither the primary capacitor $C_1$ nor the secondary capacitor $C_3$ may vary to a large extent.

If an additional capacitor $C_p$ is connected in a manner as indicated in FIGURE 15*a*, it is found from the equivalent diagram according to FIGURE 15*b* that the conditions mentioned above are not satisfied.

If, for example, a line output circuit is intended for a colour television receiver designed with circumflex tubes as shown in FIGURE 1, the primary peak voltage $\hat{V}_{C1}$ is approximately 7 kv. and at a high voltage of 25 kv. it follows that $N=3.57$ for the transformation ratio N of primary 5 relative to secondary 6. Filling in said value of N in the equations for the capacitances of FIGURE 15*b* shows that the primary capacitor $C_1$ is decreased by a value $C_p(1-3.57)=-2.57C_p$. The worst is, however, that the secondary capacitance $C'_3$ is increased by a value of $3.57^2.C_p-3.57.C_p=9.18C_p$.

Since, as stated hereinbefore, $C'_3$ must be very small, and as it is extremely difficult to keep $C'_3$ small by means of a correct winding method, it will be evident that one does not want to again increase the high-voltage capacitance thus obtained by connecting $C_p$ in the manner as shown in FIGURE 15*a*.

If, however, the capacitor $C_p$ is connected in a manner as indicated in FIGURE 16, the transformation ratio N has become 1. Then a variation of capacitance neither occurs on the primary nor on the secondary side, while yet, due to a correct choice of $C_p$ of FIGURE 15*b*, it follows that the capacitor operative in parallel with the leakage inductance $L_2$ can be brought to the correct value. In FIGURE 16, winding 5' is part of the total primary 5 and is arranged so that the interconnection to a portion of the secondary 6 produces a transformation ratio of 1:1. It is then of no importance whether capacitor $C_p$ is connected from the upper side or from the lower side of winding 5' to the secondary 6.

An embodiment of the principle of FIGURE 16 is shown in the example of FIGURE 1 by applying the variable capacity 21. This embodiment also shows a large coupling capacitor 19 which in fact does not play a part in arranging the total capactor $C_p$ because capacitor 21 is small relative to capacitor 19. For the circuit considered capacitors 19 and 21 are series-arranged so that in fact the capacitance of capacitor 21 is controlling. If therefore capacitor 19 is considered as an interconnection for the sake of simplicity, the portion of the primary 5 between the connection to the capacitor 19 and that to the capicitor 21 in the embodiment of FIGURE 1 is to be considered as the portion 5' which has as many turns as the portion of the winding 6 which is also connected between the two capacitors 19 and 21. It can then be assumed that the arrangement of capacitor 21 is between the lower side of winding 5' and secondary 6. Since capacitor 21 is variable the value of $C_p$ can exactly be adjusted therewith. This is necessary in order to add sufficient capacitance to the parasite capacitance, already present in parallel with the leakage inductance $L_2$, so that the correct value of capacitor $C_2$ is obtained.

It can also be seen in FIGURE 1 that a variable induction coil 20 is connected parallel to capacitor 21. This coil serves to reduce the value of the natural leakage inductance $L_2$ obtained by the winding method as indicated in FIGURE 4. In fact, the part of the winding 6, which is present between the connections of the capacitors 19 and 21, is located on the same leg of core V1 as the one on which the remaining part of this winding has been wound. It follows therefrom that the coupling between these two parts of winding 6 is very close. Because the part of winding 6 between the capacitors 19 and 21 is directly interconnected to the primary 5 through these capacitors, it follows that the coupling between the windings 5 and 6 is enlarged thereby and as a result thereof the leakage inductance $L_2$ is reduced. By adding induction coil 20, and because capacitor 21 is comparatively small, an additional coupling between primary 5 and secondary 6 can be adjusted by further adjusting inductor 20 so that the natural leakage inductance between primary 5 and secondary 6 is reduced to the correct value.

For an embodiment as shown in FIGURE 2 this applies to a greater degree. In fact, the peak voltages which the transistors can stand are smaller than those which tubes can stand. This means that the allowable peak voltage across the winding 5 in FIGURE 2 is smaller than that in FIGURE 1. The transformation ratio between primary 5 and secondary 6 must therefore be greater in the embodiment of FIGURE 2 than that of FIGURE 1. By again adding a capacitor 21 between a tapping on the primary 5 and a tapping on the secondary 6, and by choosing substantially 1:1 as the transformation ratio of the number of turns on the winding 5 and the number of turns on the winding 6 located between the permanent interconnection on the lower side and the tappings between which the capacitor 21 is applied, the purpose is achieved as described with reference to FIGURE 16. Also in the Example of FIGURE 2 the inductor 20 serves to adjust the correct leakage inductance $L_2$. It has been found in practice that the ratio of 1:1 is not the optimum one, but that the number of turns which is closely coupled to the secondary must be chosen to be slightly larger than the part of the primary to which this secondary is connected. A ratio of, for example, 1.4:1 or 1.3:1 is a value often occurring in practice. For the circuit diagram of FIG. 16 and accordingly for those of FIGURES 1 and 2, this means that the number of turns on the winding 6 between the junction with capacitor $C_p$ and the common junction with winding 5' is larger than the number of turns for winding 5'.

It will be evident that the arrangement of capacitor 21 and variable inductor 20 in FIGURES 1 and 2 has only been given by way of example, because here a line output transformer for a colour television receiver was concerned. If on the other hand a line output transformer intended for a monochrome receiver is considered, an EHT $R_i$ of reasonable value can be obtained by a value of $\delta/\alpha=5.7$ (see FIGURE 9) or $\delta/\alpha=6.1$ (see FIGURE 10). It follows from FIGURE 13 that for $\delta/\alpha=5.7$ and $\beta/\alpha=4.24$, the value of the leakage inductance $L_2$ is about ½ of that for the case of $\delta/\alpha=7.05$.

Such a small leakage inductance can be obtained without an extra variable inductor 20. It is also feasible that, if it is possible to go to higher values of $\beta/\alpha$ and at the same value of $\delta/\alpha$, the leakage inductance $L_2$ becomes even larger, as is shown by the behaviour of the curve of FIGURE 13. In that case it could be possible to adjust the desired $\delta/\alpha$ without the use of extra capacitors $C_p$.

What is claimed is:

1. A circuit arrangement for regulating the voltage in a high voltage load circuit comprising, an induction coil, means for supplying a current to said coil, switching means for periodically interrupting the current to said induction coil for a given time period, a deflection coil connected to said induction coil, step-up transformer means for coupling the voltage produced across the induction coil upon interruption of said current to said load circuit, the total leakage inductance of the transformer being chosen so that the current flowing through the leakage inductance and the differential coefficient of said current are zero both at the beginning and at the end of said given time period, the equivalent network formed by the parallel arrangement of the primary inductance and capacitance of the transformer and the series arrangement of the leakage inductance including a second capacitance in parallel therewith and the total load circuit capacitance being chosen so that the two circle frequencies for parallel resonance substantially satisfy the relation $$\frac{\gamma}{\alpha}\cong(2K+1)\left[1-\frac{4}{\pi^2}\cdot\frac{Z}{1-Z}\left\{1-\frac{1}{(2K+1)^2}\right\}\right]$$

wherein K is an even numbered constant, $\alpha$ is the fundamental harmonic, $\gamma$ is a higher harmonic, and $z$ is the ratio between the duration of the current interruption and the duration of the period, the leakage inductance and the second capacitance in parallel therewith being chosen so that the ratio of the circle frequency $\delta$ for the parallel resonance of said leakage inductance and capacitance and the fundamental harmonic circle frequency $\alpha$ assume values which lie between a lower limit of about $$\frac{\delta}{\alpha}\cong0.95\sqrt{\frac{\gamma^2}{\alpha^2}+\frac{\gamma}{\alpha}+1}$$

and an upper limit of about $$\frac{\delta}{\alpha}\cong2\sqrt{\frac{\gamma^2}{\alpha^2}+\frac{\gamma}{\alpha}+1}$$

2. A circuit arrangement as claimed in claim 1 further comprising a high voltage rectifier connected between the secondary winding of the transformer and the load circuit, the parameters of said equivalent network being chosen so that the circle frequency $\beta$ of the series resonance of the network closely approaches the higher harmonic circle frequency $\gamma$.

3. A circuit arrangement as claimed in claim 1 wherein K is chosen to be 2 thereby providing fifth harmonic tuning for the network.

4. A circuit arrangement as claimed in claim 2 wherein said transformer means includes a winding closely coupled to the secondary winding, a capacitor, means including said capacitor for connecting said winding to part of the primary winding so that the transformation ratio of said winding and the part of the primary winding to which it is connected is substantially 1:1.

5. A circuit arrangement as claimed in claim 1 further comprising a voltage-dependent resistor connected in parallel with the load circuit for those values of $\delta/\alpha$ approaching the upper limit.

6. A circuit arrangement as claimed in claim 3 wherein $z=0.20$, $\gamma/\alpha=4.56$, $\delta/\alpha\cong7.05$, and $\beta/\alpha=4.24$.

7. A circuit arrangement as claimed in claim 1 wherein said transformer includes a core on which the secondary winding is wound so as to approximate a triangular configuration with the base of the triangle engaging the transformer core.

8. A circuit arrangement as claimed in claim 1 wherein said transformer includes a core on which the secondary winding is wound in at least two steplike layers with the widest layer adjacent to the transformer core.

9. A deflection circuit comprising a transformer having primary and secondary winding means, means including an amplifier coupled to said primary winding for causing a periodic sawtooth current to flow therein, a deflection coil coupled to one of said transformer windings, rectifier connected to said secondary winding for rectifying the sawtooth current flyback pulses, a high voltage load circuit connected to said rectifier, said transformer having a finite value of leakage inductance and stray capacitance in parallel therewith sufficient to produce fifth harmonic tuning of the network and a ratio of $\delta/\alpha$ between lower and upper limits of $$.95\sqrt{\frac{\gamma^2}{\alpha^2}+\frac{\gamma}{\alpha}+1}\text{ and }2\sqrt{\frac{\gamma^2}{\alpha^2}+\frac{\gamma}{\alpha}+1}$$

respectively, wherein $\delta$ is the parallel resonant circuit frequency of said leakage inductance and capacitance and $\alpha$ is the fundamental harmonic circle frequency.

10. A deflection circuit as claimed in claim 9 wherein the circuit parameters are chosen to produce a 20% flyback period, whereby the ratio of $\gamma/\alpha$ is approximately 4.56.

11. A deflection circuit as claimed in claim 9 further comprising a variable inductor and a variable capacitor connected in parallel between the primary and secondary windings of the transformer.

No references cited.

RODNEY D. BENNETT, Jr., Primary Examiner

J. G. BAXTER, Assistant Examiner

U.S. Cl. X.R.

315—27

UNITED STATES PATENT OFFICE
CERTIFICATE OF CORRECTION

Patent No. 3,500,116 Dated March 10, 1970

Inventor(s) JAN JOOST RIETVELD, ET AL

It is certified that error appears in the above-identified patent and that said Letters Patent are hereby corrected as shown below:

column 1, line 57, before "period" insert -- line scan --;

column 2, line 63, cancel "Upon" and insert -- For an --; before "the" insert a comma --,--;

column 3, line 6, after "12" cancel the period --.--;

line 9, cancel "for" and insert -- in the case of --;

line 14, cancel "a" and insert -- any --;

line 68, cancel "in" and insert -- by --;

column 4, line 2, cancel "must be co-" and insert -- may be --;

column 5, line 12, cancel "That resistor" and insert -- Resistor --;

line 13, cancel "resides in the fact that" and insert -- because --;

line 31, before "if" insert a comma --,--;

column 7, lines 14 & 15, change "fα" to -- $f_{\alpha}$ --;

line 60, cancel "At" and insert -- In the case of --;

line 63, cancel "at" and insert -- for --;

column 8, line 21, cancel "gain" and insert -- improvement --;

UNITED STATES PATENT OFFICE

CERTIFICATE OF CORRECTION

Patent No. 3,500,116 Dated March 10, 1970

Inventor(s) JAN JOOST RIETVELD, ET AL PAGE - 2

It is certified that error appears in the above-identified patent and that said Letters Patent are hereby corrected as shown below:

column 8, line 36, cancel "further in-";

line 37, cancel "creasing" and insert -- a further increase in --;

line 50, cancel "is" and insert -- , or --; cancel "watts and insert -- Watts, --;

line 55, before "may" insert -- resistor --;

column 11, line 35, cancel "may" and insert -- need --;

column 12, line 43, cancel the comma ",";

line 52, cancel "VI" and insert -- 27 --;

column 14, line 56, cancel "and" (2nd occurrence) and insert a comma -- , --;

line 57, after "frequency" insert -- and $\gamma$ is a higher harmonic frequency --;

Signed and sealed this 12th day January 1971.

(SEAL)
Attest:

EDWARD M. FLETCHER, JR.
Attesting Officer

WILLIAM E. SCHUYLER, JR.
Commissioner of Patents

UNITED STATES PATENT OFFICE

CERTIFICATE OF CORRECTION

Patent No. 3,500,116 Dated March 10, 1970

Inventor(s) JAN JOOST RIETVELD, ET AL

It is certified that error appears in the above-identified patent and that said Letters Patent are hereby corrected as shown below:

column 1, line 57, before "period" insert -- line scan --;

column 2, line 63, cancel "Upon" and insert -- For an --; before "the" insert a comma --,--;

column 3, line 6, after "12" cancel the period --.--;

line 9, cancel "for" and insert -- in the case of --;

line 14, cancel "a" and insert -- any --;

line 68, cancel "in" and insert -- by --;

column 4, line 2, cancel "must be co-" and insert -- may be --;

column 5, line 12, cancel "That resistor" and insert -- Resistor --;

line 13, cancel "resides in the fact that" and insert -- because --;

line 31, before "if" insert a comma --,--;

column 7, lines 14 & 15, change "fα" to -- $f_\alpha$ --;

line 60, cancel "At" and insert -- In the case of --;

line 63, cancel "at" and insert -- for --;

column 8, line 21, cancel "gain" and insert -- improvement --;

UNITED STATES PATENT OFFICE

CERTIFICATE OF CORRECTION

Patent No. 3,500,116 Dated March 10, 1970

Inventor(s) JAN JOOST RIETVELD, ET AL PAGE - 2

It is certified that error appears in the above-identified patent and that said Letters Patent are hereby corrected as shown below:

column 8, line 36, cancel "further in-";

line 37, cancel "creasing" and insert -- a further increase in --;

line 50, cancel "is" and insert -- , or --; cancel "watts and insert -- Watts, --;

line 55, before "may" insert -- resistor --;

column 11, line 35, cancel "may" and insert -- need --;

column 12, line 43, cancel the comma ",";

line 52, cancel "VI" and insert -- 27 --;

column 14, line 56, cancel "and" (2nd occurrence) and insert a comma -- , --;

line 57, after "frequency" insert -- and $\gamma$ is a higher harmonic frequency --;

Signed and sealed this 12th day January 1971.

(SEAL)
Attest:

EDWARD M. FLETCHER, JR.
Attesting Officer

WILLIAM E. SCHUYLER, JR.
Commissioner of Patents